Figure 5:
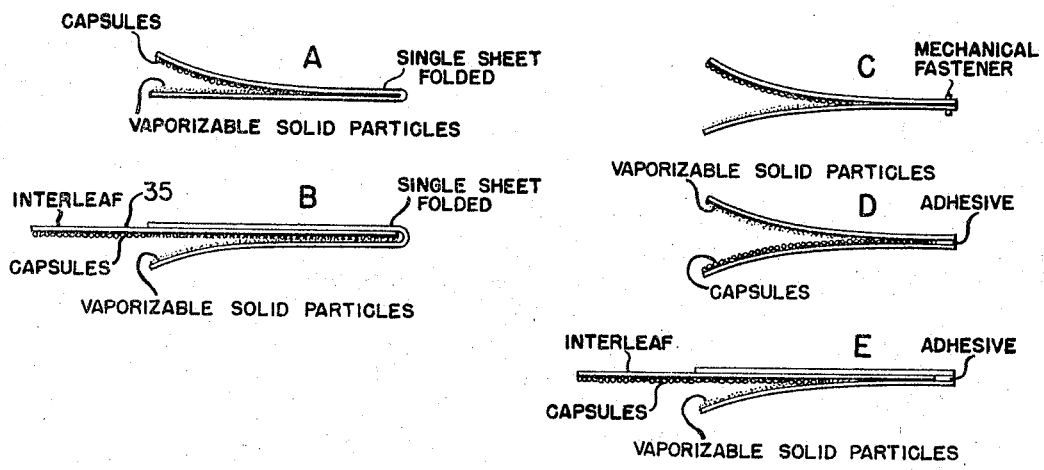

May 30, 1967 H. SCHWAB 3,322,557
THERMO-COPY SYSTEM
Filed May 11, 1964 3 Sheets-Sheet 1
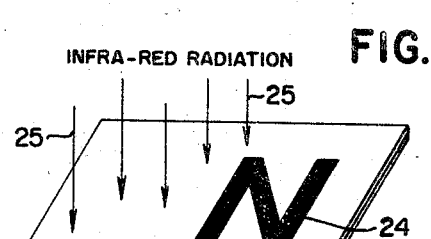
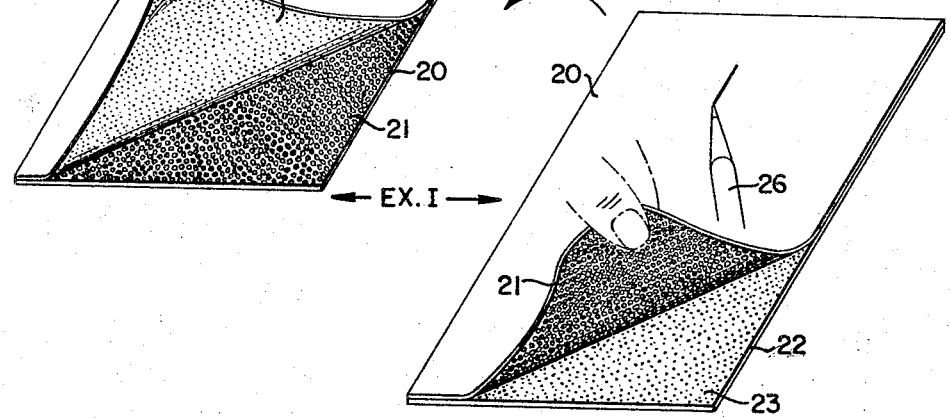
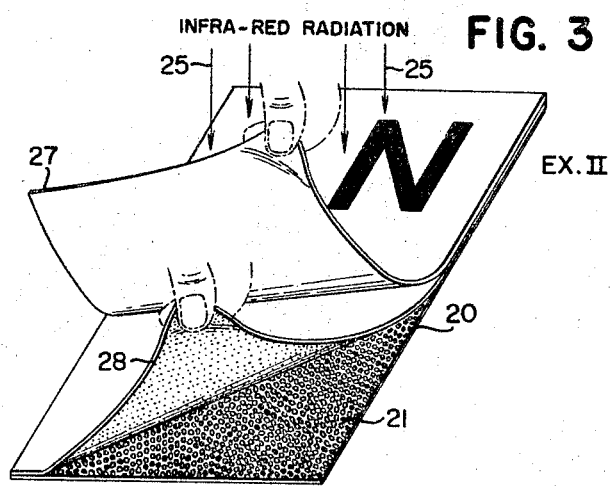
INVENTOR
HELMUT SCHWAB
BY
HIS ATTORNEYS May 30, 1967 H. SCHWAB 3,322,557
THERMO-COPY SYSTEM
Filed May 11, 1964 3 Sheets-Sheet 2
FIG. 4A
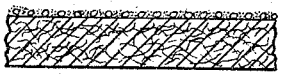
EXAMPLE ----- III
FIG. 4B
----- IV
FIG. 4C
----- V
FIG. 4D
----- VI
FIG. 4E
----- VII
FIG. 4F
----- VIII
FIG. 4G
----- IX
FIG. 4H
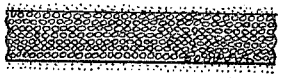
----- X
FIG. 4I
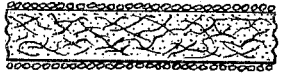
----- XI
FIG. 6
LEGEND
FILM MATERIAL 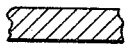
PAPER 
VAPORIZABLE SOLID PARTICLES 
CAPSULES CONTAINING MARK-FORMING COMPONENT 
INVENTOR
HELMUT SCHWAB
BY
*Louis A. Kline*
*Justin [Kingston]*
HIS ATTORNEYS United States Patent Office 3,322,557
Patented May 30, 1967

3,322,557
THERMO-COPY SYSTEM
Helmut Schwab, Dayton, Ohio, assignor to The National Cash Register Company, Dayton, Ohio, a corporation of Maryland
Filed May 11, 1964, Ser. No. 366,515
15 Claims. (Cl. 117—36.2)

This invention relates to novel record material units for use in various arrangements for making original and copy records, and in particular relates to a record material unit which produces marks in a novel manner as a result of applied heat and which produces marks in a novel manner in response to applied heat and/or pressure.

The novel record material unit in its broadest sense uses at least two kinds of closely-juxtaposed co-reacting entities, normally immobile at ambient temperatures, which upon contact produce a mark. One kind of entity is a solid material yielding a flowing reactant, primarily vaporous in physical state, upon a temperature rise, and the other kind of the entities yields a flowing reactant, primarily liquid in physical state, upon the application of pressure thereto, whereby record marks are made by heat-induced flow of the temperature-responsive entities to make contact with the pressure-responsive entities, wherever heat is applied, and marks are made by pressure-induced flow of the pressure-responsive entities to make contact with the temperature-responsive entities wherever marking pressure is applied.

The temperature-responsive entities are in the form of particles of mark-forming material which are solid at normal room temperatures, and the pressure-responsive entities are in the form of droplets of liquid mark-forming reactant material contained as discrete entities by being included as contents of capsules or by being included in an entrapping film.

When marks are made by local application of heat, they are made by the movement of the vapor into reaction contact with the liquid of the droplet without rupture of the capsule or the entrapping film, as the case may be, and will appear at the site of the droplet. However, when marks are made by the local application of pressure, they are made by the movement of the liquid into reaction contact with the solid particles when the liquid is released from the capsules or the entrapping film upon the rupture thereof by the applied pressure, and will appear at the site of the solid particle.

More particularly, the invention relates to a method of thermal reproduction comprising effecting a mark-producing reaction between two or more mark-forming components disposed in a thermotransfer unit by subjecting the unit to an elevated temperature, at least one of said components being a solid which is capable of producing a vapor at the elevated temperature, and at least one of the remaining components being encapsulated in a pressure-rupturable material; the novel thermotransfer record unit having the mark-forming components disposed in such a manner that they are in contiguous juxtaposition, so that, upon application of heat to the unit, a sufficient portion of the vaporized solid is transferred to the remaining contiguous components(s) to produce a mark in accordance with the thermal pattern. Moreover, the application of pressure to the thermotransfer unit ruptures the capsule wall and permits transfer and reaction of the encapsulated mark-forming component to the other component(s) and concomitantly produces a mark in accordance with the pressure pattern.

As stated, this invention has particular utility in the reproduction of a graphic subject by thermographic and pressure techniques. The description hereafter will describe the invention in relation to its use as a record material unit. However, other applications will be apparent to those skilled in the art from the following description of the invention in terms of its use as a record material unit.

The thermal transfer record material unit may comprise a single sheet or a double sheet. A record material unit having the mark-forming components disposed in interspersed relation on or within a single sheet of support material is referred to hereinafter as a "self-contained" unit. When the components are so disposed that, for example, one sheet contains the vapor-producing solid components and another sheet contains the encapsulated mark-forming component, such a unit is referred to hereinafter as a "transfer-receiver" unit. In both cases, in the instance of applied heat, there is migration of the vapor-producing solid to contact and react with the remaining component(s). Thus each unit, whether self-contained or transfer-receiver, has in contiguous juxtaposition at least two mark-forming components of the type described, maintained in non-mark-forming relation to each other while at ambient conditions and without applied pressure, but yielding a mark upon being subjected to heat. In the case of the self-contained unit, a visible mark appears on the same sheet, as it contains all the mark-forming components, whereas in the transfer-receiver unit the mark appears on the sheet bearing the encapsulated components, if there is migration of the vapor produced by the solid to the encapsulated component, whereat there is a reaction and consequent production of a mark according to the vapor pattern.

As noted above, a further feature of this invention is that the record units, both self-contained and transfer-receiver, may also be marked by being subjected to pressure, which ruptures the capsules and releases the encapsulated mark-forming component for contact and reaction with the other mark-forming component(s). Thus, the mark-forming system of this invention provides a flexibility such that the operator may use the unit to reproduce a graphic subject by application of heat, may use the unit as a pressure-sensitive record material, or, if desired, may use the unit as a combination of both a heat-sensitive record material and a pressure-sensitive record material.

Although the invention is directed primarily towards the making of visible marks, it is apparent that certain light-absorption marks, which are invisible to the human eye, may be formed by applying the techniques of this invention, and then sensed by photocells. In this sense, the invention is not to be restricted to the visible part of the spectrum. It is known, for instance, that certain well-known dyes, colorless in normal state, will be changed in their light-absorption characteristics with respect to that part of the spectrum just beyond the visible range, but well within the embrace of those wave-lengths which may be electrically sensed by photocells. The use of mark-forming components according to the method and compositional requirements of this invention which produces a mark sensed only by photoelectrical means is intended as within the scope of this invention.

The support material for the mark-forming components is sheet material normally used in the making of records, such as paper, or other fibrous material in felted or woven form, but it may be non-fibrous film material such as the film-forming synthetic or natural polymeric materials or parchment. For use in a thermotransfer record unit, the support material should allow vaporization of a sufficient amount of the vapor-producing solid, upon application of heat, for reaction with the encapsulated mark-forming component so as to produce a mark. For use in a pressure-sensitive record unit, the support should not substantially interfere with the migration of the encapsulated mark-forming component from the ruptured capsule to contact the vapor-producing solid mark-forming component. The support means even may consist of the surface of a hard non-sheet material, of whatever nature, if it is not desired to bury one or the other of the component reactant materials within the material. If it is desired to distribute the mark-forming component throughout the sheet(s), the support material should be such as to allow vaporization and release of the vapor-producing solid when the support is subjected to heat, and to allow the migration and contact of the encapsulated mark-forming component when the support is subjected to pressure.

Preferably, the encapsulated mark-forming component is encapsulated within seamless walls of individual capsules of microscopic size, or within seamless walls about botryoid clusters of microscopic capsules. Techniques for containing, in isolation, mark-forming components within walls of film-forming polymeric material and for applying them to support members are described in United States Patents Nos. 2,712,507; 2,730,456; 2,730,457; 2,800,457; 2,800,458 (Reissue 24,899); 2,953,454; and 3,069,370.

It is also within the purview of this invention to dispose the encapsulated mark-forming component(s) in discrete dispersion in a continuous phase film of film-forming polymeric material. Techniques for containing the mark-forming component(s) in isolation in such a film are described in United States Patents Nos. 2,374,862; 2,299,693; 2,299,694; 2,550,466; 2,550,467; 2,550,468; 2,550,470; and 2,550,471.

It is provident that normal storage temperatures be considered in choosing the vapor-producing solid mark-forming component(s) and the wall-forming capsular film material. As is well known, the vapor production of a solid increases with increased temperature; thus the solid chosen should not have a substantial vapor pressure at normal storage temperatures such as would promote premature reaction with the encapsulated mark-forming component(s). The wall-forming polymeric material should be hardened, if necessary, so as to remain intact when exposed to the elevated temperatures associated with thermographic reproduction.

The mark-forming components must be materials which are complementary to each other, in the sense that they, upon contact, yield a distinctive mark. It should be understood that this invention includes within its scope mark-forming systems requiring three or more components to produce the mark, provided that at least one is a vapor-producing solid and another is encapsulated, thereby foreclosing premature reaction.

Described hereinafter are reaction systems which are suitable for this invention, together with specific examples illustrating each type.

Type $A_1$—Lewis Acid-Base Reactions:

*Example 1*

Boron trifluoride vapor as generated by heating p-nitrobenzene diazonium fluoroborate (NBDF) and 3,3′ bis (p - dimethylaminophenyl) - 6 - dimethylaminophthalide, which is Crystal Violet Lactone (CVL), wherein $BF_3$ is the vapor component and CVL is the encapsulated component.

*Example 2*

Boron trifluoride, from NBDF, as the vapor, and benzoyl leuco methylene blue (BLMB), as the encapsulated component.

*Example 3*

Boron trifluoride, as produced above, as the vapor, and 2,5-dichloro-N-phenyl leucauramine, as the encapsulated component.

Type $A_2$—Brønsted Proton Acid-Base Reactions:

*Example 4*

4,4′isopropylidene diphenol (vapor-producing solid) and CVL (encapsulated component).

Type B—Metathetic Reaction:

*Example 5*

Double decomposition reaction between ammonium sulfide and cobalt naphthanate, wherein the ammonium sulfide is the vapor-producing solid and cobalt naphthanate is the encapsulated component.

Type C—Oxidation-Reduction Reaction:

*Example 6*

N-bromsuccinimide, as the vapor-producing solid, and BLMB, as the encapsulated component.

Type D—Change Transfer Complexes form of Lewis Acid-Base Reaction:

*Example 7*

Tetracyanoethylene (TCE), as the vapor-producing solid, and benzene or xylene, as the encapsulated component.

Type E—Form of Metathetical Reaction, referred to as chelate formation:

*Example 8*

Dithiooxamide, as the vapor-producing solid, and copper-oleate as the encapsulated component.

Generally stated, any solid, producing vapor at an elevated temperature but below that at which the supporting material or other components char or decompose, which yields a distinctive mark upon contact with the other mark-forming component(s) and which is compatible with the other materials of the record unit—for example, the support member and the wall-forming polymeric material—is satisfactory for purposes of this invention.

In the Brønsted group (Type $A_2$), phenolic compounds which behave as an acid and which produce vapor at elevated temperatures, particularly those temperatures associated with thermography, and which are colorless solids at living environment temperatures (10 degrees centigrade to 40 degrees centigrade), are particularly suitable. Mark-forming components useful with such phenolic reactant materials are organic compounds having a chromophoric color-forming group, such as the colorless materials Crystal Violet Lactone, Rhodamine-B Lactam, Michler's Hydrol, Malachite Green Lactone, 4′-(p-dimethly-aminophenylazo) benzanilide, the N-alkylphenyl derivatives of leucauramine, the N(alkyl) derivatives of leucauramine, 2,4-bis - (p-dimethylaminophenylazo) anilino-6-hydroxy sym. triazine, and many other leucauramine compounds.

To provide visual continuity and proper definition of marks to be made on the record material provided by the invention, and to provide for the confinement of the marks to the area of applied heat or pressure, the solid vapor-producing mark-forming component preferably is provided in a powdered form of several microns in average particle size, and the encapsulated component preferably is provided in capsules of substantially the same size, although these components may be of visible particle or capsule size if it is desired to have them of that magnitude for some reason.

The pressure necessary to break the isolating film wall surrounding the mark-forming component and the heat necessary to raise the temperature to vaporize the solid mark-forming component can be applied from either side of a thermal transfer unit. The heat may be furnished by a hot "writing" instrument, or by a source of radiant thermographic heat controlled by pre-printed data on the unit, as by directly-applied or reflexly-applied infra-red radiation, or by data-printing at the time by hot type held to the recording unit. It is within the scope of the invention to use both forms of energy—i.e., pressure energy and heat energy—in a simultaneous, successive, or individual manner, as desired, to make the marks on the novel record unit.

The invention also includes units in which two or more sheets have all mark-forming components on each sheet, or where one sheet carries some component(s) and the other sheet carries all components, so that migration of the vapor-producing solid produces a mark on both sheets, the manner of arranging the mark-forming components on different sheets being optional according to the desired end-use.

Moreover, the components while in a "before-use" state may be colored as long as the application of heat produces a distinctive mark in the areas proximate where the heat vaporizes the solid component, and, in the case where the unit is also pressure-sensitive, as long as a distinctive mark will show in the area where pressure is applied. Furthermore, a mixture of mark-forming components may be distributed over a sheet, so that, upon reactive contact with other components, a multi-colored mark results. Thus, for example, one capsule may contain Crystal Violet Lactone, producing dark blue, and another may be supplied with Rhodamine-B Lactam, producing a red color upon contact with the vapor-producing solid. Such capsules of different color latency may be interspersed or arranged by color potential in selected areas. In another variation, two or more chromophoric materials which individually yield different color may be present in the same liquid droplet to give a combination effect on the observer's eye.

The drawings further illustrate the invention by showing various arrangements of the mark-forming components.

The drawings are partly perspective diagrams and partly cross-section diagrams of typical systems, and show some of the array of possible combinations of the mark-forming components on a sheet or sheets, and their method of use, but the drawings are not intended to represent all possibilities within the scope of the invention.

Of the drawings:

FIG. 1 is a representation of a two-sheet record unit comprising a bottom sheet 20, which has on its upper surface microscopic capsules 21 each containing a liquid mark-forming component with capsular walls of polymeric material, and over which is laid a top sheet 22 having on its under surface a coating of vapor-producing solid particles 23 of the other mark-forming component. A thermographically responsive representative character "N" is pre-printed on the top surface of the sheet 22, and infra-red radiation 25 is shown generally applied to the top of the unit.

FIG. 2 shows the same record unit as FIG. 1, but the unit is turned over, and a printing operation is shown being performed by a pressure-printing instrument 26, as typified by a pencil-stylus. The mark made thermographically on the unit in FIG. 1 will appear on the sheet 20, and the mark made by the pressure of the pencil-stylus on the recording unit as oriented in FIG. 2 will appear on the sheet 22.

FIG. 3 shows a three-sheet unit, the bottom sheet 20 having the capsules 21 thereon, and the top sheet 27 being disclosed as without the solid mark-forming component particles, which are supplied on the bottom surface of an interleaved sheet 28. The sheet 28 may be inserted at the time of recording, or before, and either retained or thrown away after use, and may have data pre-recorded thereon for identification or other use. This three-sheet recording unit also may represent the use of more than two sheets which operate to make two copies, providing that the top surface of the sheet 28 is provided with the capsules and the bottom surface of the sheet 27 is provided with particles of the vapor-producing solid mark-forming component. This three-sheet system can be turned over as represented in the reversal as between FIGS. 1 and 2, depending on the type of recording energy to be used; i.e., heat or pressure.

FIGS. 4A to 4I, inclusive, represent combinations of sheet material and mark-forming component materials according to various possible placements of such materials thereon, and will be referred to in the identified examples appearing beside each. FIG. 4A shows a solid film type of sheet with capsules containing a liquid mark-forming component interspersed in contiguous proximity to the vapor-producing solid particles as a surface layer. It is to be understood that the film may be transparent, translucent, or opaque, such variations being a possibility except where fiber-diffusion of incident light makes for an opaque or dazzling screen effect. FIG. 4B shows a sheet of paper having capsules buried in it and having on its surface the particles of vapor-producing solid mark-forming component material. FIG. 4C represents a sheet of paper having capsules buried in it from one side, only part way through the sheet in depth, and having on the surface contiguous to the capsules the particles of vapor-producing material. FIG. 4D shows the particles of vapor-producing solid material buried throughout the thickness of a sheet of paper and having on the top surface a coating of capsules. FIG. 4E shows a sheet of paper having particles of the vapor-producing solid mark-forming material buried part way in from one side of the paper, with capsules coated on the top of that surface adjacent to the particles. FIG. 4F shows a film type of sheet support having on a surface a coating layer of the capsules overlaid by a layer of the vapor-producing solid particles. FIG. 4G shows a film material type of sheet with the vapor-producing solid particles applied as a layer next to the sheet surface and the capsules applied as a layer over the vapor-producing solid particles. FIG. 4H shows the capsules buried throughout the thickness of a sheet of paper, and having particles of the vapor-producing solid mark-forming component coated as layers on both surfaces. FIG. 4I shows the capsules in layers on the opposite surfaces of a sheet of paper, with the particles of vapor-producing mark-forming component buried throughout the sheet. Many other possible combinations of arrangement of the mark-forming components may be formulated, as the occasion arises, by one skilled in the art, attention being again called to the fact that it is the spatial proximity of the mark-forming components in the recording unit, together with the nature of the components, which is the critical aspect of the construction.

FIG. 5 shows sub-figures A, B, C, D, and E, illustrating various ways of folding or assembling sheet material into recording units to bring, into face-to-face proximity, the mark-forming materials which form the mark by pressure energy or thermographic heat energy. FIG. 5A shows a folded sheet unit with the capsules on the surface of the underside of the overfold and the vapor-producing solid particles on the upper side of the underfold. FIG. 5B shows a folded sheet unit with an insert sheet having capsules on its lower surface for use with a vapor-producing solid on the upper side of the underfold of the sheet. FIG. 5C shows a stapled unit of two sheets like the unit of FIG. 5A. FIG. 5D shows a two-sheet record unit where the sheets are bound at one end with an adhesive. Here the capsules and the vapor-producing solid particles are shown reversed from the showing of FIG. 5C. FIG. 5E shows the two-sheet system bound at one end with an adhesive and using an interleaved sheet having the capsule component thereon. In all these views of FIG. 5, the capsules are shown as circles and the particles as dots, as explained in the legend accompanying FIG. 4. No showing of these folded and multiple sheet units where the capsules or the particles are buried in the sheet is given in FIG. 5, as it is intended only to illustrate that a folded sheet can represent a record unit with proximating surface and that the same situation prevails where two separate sheets are bound together at an end, with or without an inserted sheet.

FIG. 6 is a legend of the drawing information used variously in FIGS. 4A to 4I, inclusive.

With regard to commercial utility of the invention from an economic standpoint as a thermographically responsive sheet, the amounts of expensive mark-forming materials that must be expended to produce a mark are reduced by the vapor state of at least one of the reactants. This is due to the efficiency of the vapor-capsular type of contact.

The sheets of a recording unit of the system may be used over and over again to make marks where none were made before, and one sheet of the system may be replaced with another of the same kind or of a different kind, the cooperating sheet being retained for more than one operation, and the old sheet and the new sheet may cooperate in one or the other modes of applying energy to cause the marks to appear. It is apparent that unreacted vapor condenses on cooling to a solid and is ready for re-use instead of being a nuisance as a smudging detritus.

More than one copy sheet may be used in a recording unit, or packet, providing that the proper placing of the sheets and the associated mark-forming components is made, and providing that the pressure or the heat used penetrates the sheets to a degree to give distinctive data recording.

It is also a part of this invention to provide individual capsules and mixtures, the member capsules having different reactions to heat and pressure, in addition to differences, as mentioned, with respect to color-forming hue, to make identification of marking operations possible, by the color of the print in respect to what variation in means (heat or pressure) brings about the coloration in a given area, and these differences may be obtained by differences in kind, amount, and characteristics of the wall material, the liquid mark-forming component as to mobility and activity, and the vapor-producing solid material as to activity on physical or chemical characteristics.

The physical and physio-chemical relations in which the mark-forming components may be arranged in or on a single sheet, or among several sheets, having been outlined, and patent disclosures showing generally how to make capsules and capsule units of various kinds and how to apply them to the support member having been referred to, the invention will be further illustrated by reference to a preferred system of mark-forming components that produce a mark on vapor-liquid (heat-sensitive) or solid-liquid (pressure-sensitive) contact, and that are useful for making the novel record material units.

*Example I*

In this, the preferred, embodiment of the invention, the reaction between a liquid solution of the chromophore-bearing mark-forming component 3,3-bis-(p-dimethylaminophenyl)-6-dimethylaminophthalide, commonly called "Crystal Violet Lactone," or "CVL," which is disclosed in United States patent Re. 23,024, issued Aug. 17, 1948, on original United States Patent No. 2,417,897, issued Mar. 25, 1947, on the application of Clyde S. Adams, and the room-temperature-solid aromatic acid mark-forming component 4,4',isopropylidene diphenol will be used.

The diphenol and CVL components were prepared as follows:

PHENOL DISPERSION

|  | Wet Basis, grams | Dry, grams | Percent of solids |
|---|---|---|---|
| 4,4',isopropylidene diphenol | 17 | 17 | 84.58 |
| Natrosol 250a, hydroxyethyl cellulose | 40.1 | 3 | 15.42 |
| Water | 23 | | |
|  | 80.1 | 20 | 100.00 |

CVL CAPSULES

Internal phase:
  90 grams CVL
  1,940 grams Aroclor (chlorinated diphenyl containing 40% chlorine)
  970 grams Magnaflux—a petroleum distillate of 380 to 500 degrees Fahrenheit boiling-point range, 50% paraffinic and 50% naphthenic
Emulsion:
  1,425 grams of the Internal Phase
  925 grams 11% aqueous solution of gelatin
  507 grams of $H_2O$
  4 grams of Elcide (bactericide), which contains as an active ingredient sodium ethylmercurithiosalicylate and sodium o-phenylphenate
Coacervation:
  421 grams Emulsion (210 I.P., 15 grams gelatin)
  91 grams 11% gum arabic (aqueous)
  64 grams 1% PVM/MA polyvinylmethylether maleic anhydride
  632 grams of $H_2O$
Hardening of Capsules:
  13.5 grams 14.7% acetic acid
  ½ milliliter glutaralydehyde/gm gelatin
  1 milliliter PVM/MA/gm gelatin Preparation of coating for self-contained unit: Mix 4 parts of CVL capsules with 1 part of phenol dispersion, with mechanical mixing. Draw down the coating using #17 wire wound coating rod to give a dry coating weight of 4.5–5 lbs./ream, 25 by 38 inches.

Ream=500 sheets; dry weight calculated by difference in weight of dry sheet with coating and the uncoated sheet.

Raw stock: The uncoated sheet may be of a weight of 23 pounds per ream of 25 by 38 inches.

The following phenols may be substituted for 4,4'-isopropylidene diphenol for reaction with Crystal Violet Lactone:

p-tert-butylphenol, melting point 100 degrees±0 degree centigrade.
2,4-dinitrophenol, melting point 114 to 115 degrees centigrade.
3,4-dichlorophenol, melting point 65 degrees centigrade (useful in cool environment).
0,0'-diphenol, melting point 103 to 104 degrees centigrade.
4,4'-methylene-bis(2,6-di-tert-butylphenol), melting point 155 degrees centigrade.
2-nitro, 4-chloro-phenol, melting point 111 degrees centigrade.
p-nitro-phenol, melting point 113 to 114 degrees centigrade.
pentachloro-phenol, melting point 188 degrees centigrade.
p-phenyl phenol, melting point 164 degrees centigrade.

Organic acids which melt above 100 degrees Centigrade have been found particularly useful as a group for reaction with base material such as Crystal Violet Lactone. Benzene phenols and naphthols are examples of classes of vapor-producing solid acids. Especially useful are those dihydroxy diphenyl alkanes in which both aromatic rings are attached to the same carbon atom and the hydroxy substituents appear in the ortho or para positions in the aromatic rings; such compounds are commonly called bis-phenols. Examples of effective and representative carboxylic acids are phenoxyacetic acid; phenylacetic acid; benzoic acid; salicylic acid; ortho-mercaptobenzoic acid; and alpha-hydroxyphenylacetic acid. As an example of a Lewis acid not containing any protons, that may be used in this invention, tetracyanoethylene may be cited, although such use would be productive of poisonous gases and would indicate the production of such gases by the coloration. Examples of acidic imides useful in the practice of this invention are succinimide and phthalimide.

*Example II*

This example is concerned with a three-sheet system consisting of two outer sheets and an interleaved sheet 28 (FIG. 3). The sheet 28, either permanently being kept in place or inserted at will between the outer two sheets, to be retained or thrown away, is coated on the back with particles of a vapor-producing solid acidic compound selected from those set forth in Example I, and cooperates with the liquid mark-forming compound in capsules 21 on the sheet 20. In this recording unit, the sheet 27 consists of, say, a document wihch is not pre-treated in any manner except by having data printed thereon in thermographic-light-absorbent characters; that is to say, for example, characters printed in ink which is more absorbent of, and heated to a relatively high temperature by, infrared radiation than is the background, as illustrated by the letter N. The heat delivered from the high temperature at N is transmitted by conduction contact through the top sheet and the sheet 28, thereby vaporizing the acidic particles in direct registry with the printed letter N, to create locally the vapor which makes contact with the opposed contiguously juxtaposed capsules 21 on the sheet 20 held thereagainst to make a mark N on the sheet 20. Not only may be a three-sheet system be involved, but the back of the sheet 20 in turn may be coated with particles of the vapor-producing solid mark-forming component material to cooperate with an undersheet made like the sheet 20, etc., through as many sheets as the heat from the letter N will pass by conduction.

The unit of FIG. 3 may be turned over 180 degrees and pressure applied to the reverse side of the sheet 20 to break the capsules 21 to make a mark on the solid particles 28 of the inserted sheet, and the sheet 28 may be removed, to be kept as a copy of what was impressed by pressure upon the back of the sheet 20. For the purpose of this example, the selected chromophoric material is Rhodamine-B Lactam, yielding a red color, and the solid vapor-producing material is p-nitrophenol.

*Example III*

Example III is illustrated by FIG. 4A, in which a film of polymeric material, such as cellulose acetate, is shown coated on one side with an interspersion of capsules containing a liquid, mark-forming component as selected, and the solid particles of co-reactant, as selected, to provide a self-contained sheet which is capable of yielding a mark by pressure applied to either side, but preferably to the side on which the coating is situated, and also of yielding a mark by heat applied in the configuration of the data selected to be recorded, whether such heat be applied by a hot type member or by means of the thermographic radiation type of heating, as illustrated in FIG. 1. It is to be noted that marks may be made in different areas of this sheet by either method of applying energy at different times or at the same time. In this example, the chromophoric material is Michler's Hydrol, yielding a blue color, and the vapor-producing material is β-naphthol.

*Example IV*

In this example, illustrated in FIG. 4B, liquid mark-forming-component-containing capsules are shown embedded throughout the structurue of a paper sheet, with the mark-forming vapor-producing solid particles distributed on the top surface, and in this paper sheet, which is responsive to either pressure or heat, the colored marks are visible from the side on which the vapor-producing particles are coated.

*Example V*

Example V is illustrated in FIG. 4C and is similar to the example of FIG. 4B except that here the capsules are buried only part-way throughout the thickness of the paper sheet, the data recorded thereon by pressure or printing with high temperature means also appearing on the side of the sheet on which the vapor-producing solid particles rest. In this example, the chromophoric material is Malachite Green Lactone, and the vapor-producing solid material is p-phenyl phenol.

*Example VI*

This example is illustrated in FIG. 4D, wherein particles of the vapor-producing solid are distributed throguhout the body of the sheet and the capsules containing the chromophoric liquid material are coated on the top surface of the sheet. In this construction, when heat is applied to the sheet, the mark is formed, as is always the case when heat is used, at the site of the capsules; i.e., in this case on the top surface. If pressure is used to rupture the capsules, the mark appears where the vapor-producing solid is situated, and, depending on the depth to which the released liquid diffuses into the paper, the mark appears in depth on the sheet. In this example, the chromophoric material is a mixture of Michler's Hydrol and Rhodamine-B Lactam, and one of the mentioned diphenyl compounds, as selected, is the vapor-producing material.

*Example VII*

This example, illustrated in FIG. 4E, in which particles of acid vapor-producing solid material are shown buried only part-way through a paper sheet and wherein capsules of the liquid, mark-forming component are distributed on the top surface of the sheet, has the same functional attributes as stated in connection with Example VI except that the possibility of penetration of the mark throughout the sheet beyond the particles is non-existent. In this example and through Example XI, a selection may be made from the mentioned acidic vapor-producing components and the mentioned liquid, mark-forming components.

*Example VIII*

In this example, illustrated in FIG. 4F, the support member is a polymeric material film over the surface of which is a layer of capsules containing a liquid, mark-forming component, and over the layer of capsules is a layer of the vapor-producing acidic particles. The result from application of sufficient heat to produce vapor from the acid particles or from pressure sufficient to rupture the capsules is to have the recorded data made visible from the top surface of the film.

*Example IX*

In this example, shown in FIG. 4G, the reverse order of layers is shown on the top surface of the film support, the capsules being the top layer and the vapor-producing solid particles being next to the surface of the support film, with the same gross result as that set forth in Example VIII; namely, that the data recorded by pressure or by application of heat is visible from the top surface of the film. In these units where a polymeric film support material is used, it may have transparent or translucent characteristics, enabling its use as a projected light control means.

*Example X*

In this example, shown in FIG. 4H, the capsules containing the liquid mark-forming component are embedded through the body of a sheet of fibrous material, and the vapor-producing solid particles are distributed on the surface of each side of the sheet, so that, when heat is applied, a mark forms where the capsules are situated and a mark forms where the vapor-producing solid particles are situated if the recording is carried out by pressure. The amount of pressure and heat determines to what depth the phenomenon of coloration is to appear when the capsules are broken or whereto the vapors penetrate into the fibrous material to make contact with the unbroken capsules.

*Example XI*

This example, the reverse of Example X, is shown in FIG. 4I, wherein the particles of vapor-producing solid acidic material are distributed through the body of a fibrous sheet and capsules containing the liquid mark-forming component are shown distributed over the surface of either side, the released liquid penetrating into the paper, where the capsules are broken, to a depth determined by the amount and the mobility of the released fluid, and the vapors which are produced within the paper migrating to the surface of the sheet to form color with the unbroken capsules wherever contact is made therewith or where the vapor makes contact with any released liquid from capsules that have previously been broken.

The foregoing examples are not to be deemed exhaustive of the various spatial and architectural combinations which the mark-forming components may assume in contiguous proximity on or within a supporting sheet of record material, the various specific combinations in Examples I to XI merely showing a variety of ways in which the combination may occur.

In the system of this invention, where a mark may be formed by application of heat or pressure to a two-sheet transfer record unit, it is possible, if and when desired, to apply the two forms of energy individually or combined at different times to make marks on one or the other of the sheets, as explained. Also, marks may be made on one registering area by one method and on another registering area by another method, and the separate marks will be coincident with the areas where a particular form of energy is applied. This has advantages in recording on certain business forms where, say, taking FIG. 5B as an example, heat is applied to the system to make a mark on the interleaved capsule-bearing sheet and in another area pressure is applied on the top leaf to make a mark in a different place on the particle-bearing surface of the folded sheet. The use of these sheets with the different forms of applied energy can be carried on at different times or at the same time, as desired, and also the same form of energy may be applied to different portions areawise at the same time or at different times.

In those instances where it is desired to substantially reduce the chance for premature marking by pressures encountered in storage and handling of the novel record units, the vapor-producing solid may be coated with a protective film such as carboxymethyl cellulose or polyvinyl alcohol—the coating to be of such a nature that, while preventing liquid contact, it does not interfere with the vapor-production of the solid when the unit is subjected to thermographic temperatures.

Although, in the description of the invention, reference has been made to the application of heat generated by thermographic techniques, this being brought about, for example, by infra-red radiation, as shown in the drawings, it is within the scope of the invention to use, for the formation of the data to be recorded, a thermal type of printing unit in which a hot printing type member is used to form a character, either as a single character, as a part of a character, or as a term of characters. A matrix type of thermal printing type body is disclosed in an application for United States Letters Patent, Ser. No. 292,351, filed July 2, 1963, by Robert C. Meckstroth et al., which issued on June 30, 1964, as United States Patent No. 3,139,026, and to which reference is made for a type of thermal printer that utilizes individually-heated character-forming portions that may be selected in combinations to form data.

It will be apparent that the back of an over-sheet may be supplied with a coating of the vapor-producing component arranged in the form of characters in direct image configuration or in mirror image configuration, so that, if the over-sheet surface so coated is placed against an under-sheet surface having capsule-retained liquid droplets comprising the chromogenic component, then the transfer may be made from the over-sheet to the under-sheet, by placing together the color-forming-component-supplied surfaces and subjecting the record pair unit so formed to heat generally applied, to mark the recording on the undersheet capsules. Such generally-applied heat may be furnished by hot rollers or a hot plate applicator.

What is claimed is:

1. A mark-forming unit comprising at least one liquid mark-forming component, protectively retained from flow by a pressure-rupturable barrier material, and at least one other mark-forming component, which is a solid, producing a vapor at elevated temperature and having a relatively low vapor pressure at ambient temperatures, said barrier material permitting movement of the vapor into reaction contact with the liquid without rupture of the barrier material, said mark-forming components being supported by a sheet material and disposed therewith so that relative to each other the mark-forming components are in contiguous juxtaposition and so that the vapor of the solid mark-forming component, upon production of vapor, will contact and react with at least one liquid mark-forming component protectively retained from flow by unruptured barrier material and produce a mark at the zone of contact, while maintaining the protectively-retained mark-forming component from flow; said components also producing a mark by rupture of the barrier to allow flow of the retained liquid mark-forming component for reaction contact with at least one other mark-forming component.

2. A mark-forming record unit having a duality of action characteristics in response to energy selectively applied according to type of energy used and the location of the application of the energy, and the unit being receptive of marking ink which is responsive by becoming elevated in temperature when subjected to infra-red radiation, said unit having included in marking areas droplets of liquid comprising one of two co-reactants producing color on contact, said droplets being positioned in contiguous proximity to particles comprising the other of the two co-reactants, said particles being solid at ambient temperatures and producing a fluid vapor at the elevated temperatures associated with irradiated thermographically responsive marking ink to furnish reaction contact at points of elevated temperatures between the co-reactants situated there, and the droplets normally being retained individually in situ by pressure-rupturable film material, which film material allows contact of the produced vapor with the proximate retained droplets at the elevated temperature without rupture of the film material, whereby a pattern of pressure applied to the unit will by itself rupture the film material to release the droplets in the pressure pattern to cause a colored mark to appear coextensive with the pressure pattern, and the infra-red radiation of thermographically responsive ink applied to the unit in a pattern will cause a colored mark to appear that is coextensive with the pattern of radiation, such marks appearing with respect to the unit at points to where the liquid or the vapor flows.

3. A mark-forming unit comprising at least one liquid mark-forming component that is protectively retained by film material, and at least one solid mark-forming component, said solid mark-forming component producing a vapor at elevated temperature and having a relatively low vapor-pressure at ambient temperatures, said mark-forming components being supported by a sheet material and disposed so that relative to each other the mark-forming components are in contiguous juxtaposition and so that the vapor of the solid mark-forming component, upon such vapor's being produced, will contact and react with the protected component while the protective film remains intact and produce a mark at the zone of contact, rupture of the protective film material permitting flow of the liquid and consequent reaction contact between the mark-forming components at ambient temperature.

4. A mark-forming unit comprising a capsule protectively retaining at least one liquid mark-forming component, the wall material of said capsule being a polymeric material, and at least one unprotected solid mark-forming component, said solid mark-forming component producing vapor at elevated temperatures and having a relatively low vapor pressure at ambient temperatures, said polymeric material permitting movement of said vapor into reaction contact with the liquid without rupture of the polymeric material, said mark-forming components being supported by sheet material and disposed so that relative to each other the mark-forming components are in contiguous juxtaposition and so that the vapor produced by the solid mark-forming component will contact and react with the retained component and concomitantly produce a mark at the zone of contact.

5. The unit of claim 4 wherein the encapsulated mark-forming component is present as microcapsules each having a seamless wall of polymeric material surrounding the mark-forming component.

6. The mark-forming unit of claim 4 wherein the encapsulated mark-forming component is a liquid base material and wherein the vapor produced from the solid is an organic acidic compound.

7. The unit of claim 6 wherein the liquid mark-forming component comprises Crystal Violet Lactone and the vapor-producing solid is 4,4'-isopropylidene diphenol.

8. A mark-forming unit comprising a single sheet-like support member having disposed thereon a capsule including capsules, each wall protectively retaining at least one liquid mark-forming component, the wall material of said capsule being a polymeric material, and having disposed thereon at least one unprotected solid mark-forming component, said solid mark-forming component producing a vapor at elevated temperatures and having a relatively low vapor pressure at ambient temperatures, said wall material permitting movement of the vapor into reaction contact with the liquid without rupture of the wall material, said mark-forming components being supported by sheet material and disposed so that relative to each other the mark-forming components are in contiguous juxtaposition and so that the solid mark-forming component vapor will contact and react with the retained component and concomitantly produce a mark at the zone of contact.

9. A mark-forming unit comprising a plurality of sheet-like support members wherein one sheet-like member has disposed thereon capsules, each of which capsules includes a wall protectively retaining at least one liquid mark-forming component, the wall material of said capsule being a polymeric material, and a second sheet-like support member having disposed thereon at least one unprotected solid mark-forming component, said solid mark-forming component producing a vapor at elevated temperatures and having a relatively low vapor pressure at ambient temperatures, said polymeric material permitting movement of said vapor into reaction contact with the liquid without rupture of the polymeric material, said mark-forming components being disposed on said sheet material so that relative to each other the mark-forming components are in contiguous juxtaposition and so that the vapor of the solid mark-forming component, when produced, will contact and react with the retained component and concomitantly produce a mark at the zone of contact.

10. A thermotransfer process for producing a facsimile of graphic subject matter from an original record of the subject matter, wherein said original graphic subject matter, to the exclusion of the remaining portions of the original, is selectively capable of achieving elevated temperatures and substantially instantaneously transmitting heat to a vapor-producing solid mark-forming component and thereby releasing vapor for contact and reaction with at least one other mark-forming component to thereby concomitantly produce a mark in the area where the vapor of the solid component contacts the other mark-forming component, comprising:

(1) disposing at least one vapor-producing solid mark-forming component and at least one liquid encapsulated mark-forming component in contiguous juxtaposition on a sheet-like support member, the walls of the encapsulated component permitting contact of the vapor with the liquid, (2) disposing said original record in thermoconductive relationship with the vapor-producing solid mark-forming component so as to form a thermotransfer unit, and (3) subjecting the graphic matter of the original record to a source of energy to provide heat images of the graphic subject matter, which images effect the production of vapor and migration of the vapor of the solid mark-forming component to the other mark-forming component, thereby producing a mark at the site where the mark-forming components make contact.

11. The process of claim 10 wherein the vapor-producing solid mark-forming component is disposed on one sheet-like support member and the encapsulated mark-forming component is disposed on a second sheet-like support member.

12. The process of claim 10 wherein both the vapor-producing solid mark-forming component and the encapsulated mark-forming component are disposed on a single sheet-like support member.

13. The process of claim 10 wherein the encapsulated mark-forming component is present as microcapsules each having a seamless wall of polymeric material surounding the mark-forming component.

14. The process of claim 10 wherein the encapsulated mark-forming component is a liquid base material and wherein the vapor-producing solid is an organic acidic compound.

15. The process of claim 14 wherein the liquid mark-forming component comprises Crystal Violet Lactone and the vapor-producing solid is 4,4'-isopropylidene diphenol.

References Cited

UNITED STATES PATENTS

| | | | |
|---|---|---|---|
| 2,770,534 | 11/1956 | Marx | 117—36.2 |
| 2,929,736 | 3/1960 | Miller et al. | 117—36.9 X |
| 2,972,547 | 2/1961 | Tien | 117—36.2 |
| 3,020,171 | 2/1962 | Bakan et al. | 117—36.2 |
| 3,121,650 | 2/1964 | Meissner | 117—36.2 |

MURRAY KATZ, *Primary Examiner.*

UNITED STATES PATENT OFFICE
CERTIFICATE OF CORRECTION

Patent No. 3,322,557                              May 30, 1967

Helmut Schwab

It is hereby certified that error appears in the above numbered patent requiring correction and that the said Letters Patent should read as corrected below.

Column 13, lines 7 and 8, for "support member having disposed thereon a capsule including capsules, each wall protectively retaining at least" read -- support member having disposed thereon capsules, each capsule including a wall protectively retaining at least --.

Signed and sealed this 6th day of May 1969.

(SEAL)
Attest:

Edward M. Fletcher, Jr.
Attesting Officer

Commissioner of Patents